8351X
T. A. Chandler,
Fire Engine,
Patented Aug. 9, 1834.
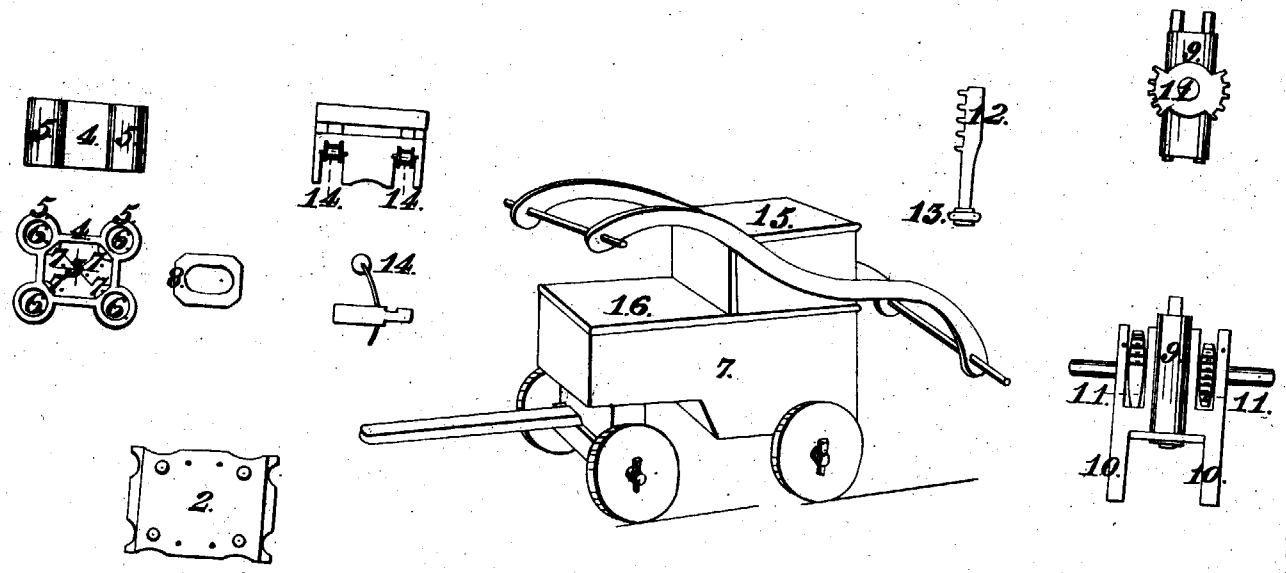
N. PETERS, PHOTO-LITHOGRAPHER, WASHINGTON, D. C.

Aug. 9. 1834

8351X

Thomas A. Chandler of Norfolk, New York,

Letters Patent.

The schedule referred to in these Letters Patent and making
part of the same, containing a description in the words of the said
Thomas A. Chandler himself of his improvement in an Engine
for elevating and throwing water and compressing and expanding
water and air.

To all to whom these presents shall come
Be it known that I Thomas A. Chandler, of Norfolk in the
county of St Lawrence and State of New York, have invented a
new and useful improvement in an Engine for elevating and
throwing water, and compressing and expanding water and Air
and that the following is a full and exact description of the
construction and operation of the said Machine as invented
or improved by me the model and drawing now presented to
the Patent Office will show the different parts numbered as
follows viz, —— No 1 The receiver or reservoir which is
made of wood, —— No 2. The bottom of four piston stocks with
a hole under each to let in the water, and valves to stop the
water and force it into the main stocks with a falling piston
made of wood — 3 The bottom of the main stock (is used)
covered with leather, the corners turned inward and forming
valves to cover the holes from the four piston stocks to the main
stock to keep the water from returning 4. The main stock
into which the water is forced from the piston stocks this is
made of copper brass or other metal, 5 The piston stocks
with holes at the bottom to let the water into the main stock
and valves to prevent the water from returning made of copper
brass or other metal, and ought to be cast with No 4.
6. The valves on the bottoms of piston stocks which are copper, → Drawing brass, or other Metal covered and hung with leather on the face side to stop the hole tight 7. The valves covering the holes leading from piston stocks to the main stock which are made as the valves before described No. 6.

8. The cap of the main stock which is to be made fast with bolts and screws, or cast with it, same metal as No. 4

9. The air chest which is hollow, (of copper or brass) with two pipes of same metal passing through to discharge the water having screws at the top for two hose to be screwed on, in order to throw water in two different ways, or both one way as may be required or a cap instead of one pipe in case one stream of water only is wanted, in which case the water pipe having the cap on will serve as an additional air chest, the air chest No 9 is open at the bottom and fastened to the cap of the main stock No. 8, and serves to regulate and keep steady the stream or streams of water by the elasticity of the air, One of these water pipes may have a hose of any length to convey water in the inside of the building while the other with a short hose and discharge pipe will throw water on the outside or in any other direction at the same time, 10. The harness for hanging the brakes for working the pistons which should be made of iron, which is a bench with a hole through to receive the air chest and setting closely upon the cap of the main stock No 8 with four legs the whole length and close to the main stock at the bottom of which are four feet turned square out and through the feet are bolts with screws to fasten through the bottom of the receiver or receivers No 1 which makes the whole machinery firm and solid On the top of this bench raises two posts with a mortice in each at the top through which hang and play the cog wheels the sides of these morties supporting there axles, the whole of the harness should be cast together. 11 The cog wheels for raising and falling the pistons, on the axles of which the brakes are fastened which should be made of iron or brass, the brakes are of iron 12. The piston stems with cogs to match the cog wheels No. 11. Should be made of iron or brass one on each side of each cogwheel making four in number 13. The pistons (are (copper or brass) having a moveable cap at the bottom which is fastened with copper or brass bolts and screws to the upper part of the piston to secure and tighten the packing so that by turning the screws you may tighten or loosen the piston at pleasure 14 The piston polleys, iron or brass, to keep the piston stems geared, which are at the top of iron posts setting on and firmly secured to the deck No. 16.

15 The case to cover the harness is wood, a box with four sides and a top, though the top is holes for the pipes to pass and a railing round to prevent the foot from slipping when a man stands up there to direct the water and two doors on the sides one fore, the other aft, for the purpose of opening and viewing, repairing or oiling the machinery 16 The deck which is a cover to the receiver No. 1 with a trap door before and another behind the machinery, hung on hinges at one end and the other end fastened down with a hook to open for the purpose of pouring in water with buckets or a hose, The Machine will receive and discharge twice the quantity of water in the same length of time with half the manual labor of the common fire engine and can be built with much less expence

I claim the <u>arrangement</u> of the several parts so as to produce the engine herein described

Thomas A Chandler

Witnesses
John Taylor
Dorastus Colburn

Exd S.H.J.

1152 ar 83